(12) United States Patent
Broecker et al.

(10) Patent No.: US 9,095,956 B2
(45) Date of Patent: Aug. 4, 2015

(54) METHOD AND APPARATUS FOR FORMING CARBON DIOXIDE PARTICLES INTO A BLOCK

(75) Inventors: Richard Broecker, Milford, OH (US); Matthew Gunderson, Cincinnati, OH (US)

(73) Assignee: Cold Jet LLC, Loveland, OH (US)

( * ) Notice: Subject to any disclaimer, the term of this patent is extended or adjusted under 35 U.S.C. 154(b) by 909 days.

(21) Appl. No.: 12/121,356

(22) Filed: May 15, 2008

(65) Prior Publication Data

US 2008/0296797 A1 Dec. 4, 2008

Related U.S. Application Data

(60) Provisional application No. 60/930,349, filed on May 15, 2007.

(51) Int. Cl.
*B24C 1/00* (2006.01)
*B29C 43/00* (2006.01)
*B27N 3/00* (2006.01)
*B29C 59/00* (2006.01)

(52) U.S. Cl.
CPC . *B24C 1/003* (2013.01); *B27N 3/00* (2013.01); *B29C 43/00* (2013.01); *B29C 59/00* (2013.01)

(58) Field of Classification Search
CPC ........... B27N 3/00; B29C 43/00; B29C 59/00
USPC ......................................... 264/109, 220–222
See application file for complete search history.

(56) References Cited

U.S. PATENT DOCUMENTS

| 2,282,460 A | 5/1942 | Dickey |
| 3,070,967 A | 1/1963 | Uren |

(Continued)

FOREIGN PATENT DOCUMENTS

| EP | 0 029 867 | 10/1981 |
| JP | 56 054217 | 5/1981 |

(Continued)

OTHER PUBLICATIONS

International Search Report dated Aug. 27, 2008 for Application No. PCT/US2008/063726.

(Continued)

*Primary Examiner* — Richard Crispino
*Assistant Examiner* — Matthew Hoover
(74) *Attorney, Agent, or Firm* — Frost Brown Todd LLC

(57) ABSTRACT

A block former comprises a portable device for compression forming of carbon dioxide particles into a non-homogenous block of carbon dioxide. The formed non-homogenous block can be used with carbon dioxide blasters that shave the formed block, and then eject the carbon dioxide shavings into a pneumatic jet as a blast media for cleaning surfaces. The block former further comprises a control system comprising a logic system of switches, valves, and timers to perform a timed sequence of events to form loose carbon dioxide particles into a non-homogenous block, to release compression on the block, and to eject the formed block from the block former. A single compression surface is provided to compress the carbon dioxide particles block, to release pressure on the block, and to eject the block from the block former device. The carbon dioxide particles used to form the non-homogeneous block can vary in size from snow to chunks or pellets.

20 Claims, 9 Drawing Sheets

(56) References Cited

U.S. PATENT DOCUMENTS

| | | |
|---|---|---|
| 3,576,112 A | 4/1971 | Frost et al. |
| 3,670,516 A | 6/1972 | Duron et al. |
| 3,952,530 A | 4/1976 | Tyree, Jr. |
| 4,744,181 A | 5/1988 | Moore et al. |
| 4,843,770 A | 7/1989 | Crane et al. |
| 4,947,592 A | 8/1990 | Lloyd et al. |
| 5,018,667 A | 5/1991 | Lloyd |
| 5,050,805 A | 9/1991 | Lloyd et al. |
| 5,071,289 A | 12/1991 | Spivak |
| 5,109,636 A | 5/1992 | Lloyd et al. |
| 5,188,151 A | 2/1993 | Young et al. |
| 5,203,794 A | 4/1993 | Stratford et al. |
| 5,249,426 A | 10/1993 | Spivak et al. |
| 5,288,028 A | 2/1994 | Spivak et al. |
| 5,301,509 A | 4/1994 | Lloyd et al. |
| 5,473,903 A | 12/1995 | Lloyd et al. |
| 5,520,572 A | 5/1996 | Opel et al. |
| 5,525,093 A | 6/1996 | Palmer, Jr. |
| 5,528,907 A | 6/1996 | Pint et al. |
| 5,571,335 A | 11/1996 | Lloyd |
| 5,623,831 A | 4/1997 | Mesher |
| 5,660,580 A | 8/1997 | Lehnig |
| 5,795,214 A | 8/1998 | Leon |
| 6,024,304 A | 2/2000 | Sawada |
| 6,042,458 A | 3/2000 | Lehnig et al. |
| 6,346,035 B1 | 2/2002 | Anderson et al. |
| 6,447,377 B1 | 9/2002 | Londenberg et al. |
| 6,695,679 B2 | 2/2004 | Anderson et al. |
| 6,695,685 B2 | 2/2004 | Stratford et al. |
| 6,726,549 B2 | 4/2004 | Rivir et al. |
| 6,824,450 B2 | 11/2004 | Opel |
| 2004/0121711 A1 * | 6/2004 | Opel ............................... 451/75 |

FOREIGN PATENT DOCUMENTS

| | | | |
|---|---|---|---|
| WO | WO 91/04449 | 4/1991 | |
| WO | WO 94/14572 | 7/1994 | |
| WO | WO 94/16861 | 8/1994 | |
| WO | WO 9416861 A1 * | 8/1994 | ............... B24C 1/00 |
| WO | WO 03/101667 | 12/2003 | |

OTHER PUBLICATIONS

Written Opinion dated Aug. 27, 2008 for Application No. PCT/US2008/063726.
U.S. Appl. No. 11/123,974, filed May 6, 2005, Lee et al.
Search Report dated Jul. 5, 2006 for PCT/US2006/009017.
Abstract for JP 56054217, dated May 14, 1981.

* cited by examiner

METHOD AND APPARATUS FOR FORMING CARBON DIOXIDE PARTICLES INTO A BLOCK

BACKGROUND OF THE INVENTION

The present invention relates generally to particle blasting using cryogenic material, and is particularly directed to a method and device involving blasting with carbon dioxide pellets or particles that have been formed into a block from which carbon dioxide blast media is generated.

Carbon dioxide blasting systems are well known, and along with various associated component parts, are shown in U.S. Pat. Nos. 4,744,181, 4,843,770, 4,947,592, 5,018,667, 5,050,805, 5,071,289, 5,109,636, 5,188,151, 5,203,794, 5,249,426, 5,288,028, 5,301,509, 5,473,903, 5,520,572, 5,571,335, 5,660,580, 5,795,214, 6,024,304, 6,042,458, 6,346,035, 6,447,377, 6,695,679, 6,695,685, and 6,824,450, all of which are incorporated herein by reference.

Typically, particles, also known as blast media, are fed into a transport gas flow and are transported as entrained particles to a blast nozzle, from which the particles exit, being directed toward a workpiece or other target (also referred to herein as an article). Particles may be stored in a hopper or generated by the blasting system and directed to the feeder for introduction into the transport gas. One such feeder is disclosed in U.S. Pat. No. 6,726,549, issued on Apr. 27, 2004 for Feeder Assembly For Particle Blast System, which is incorporated herein by reference.

Carbon dioxide particles may be initially formed as individual particles, such as by extruding carbon dioxide through a die, or as a solid homogenous block. Within the dry ice blasting field, there are blaster systems that utilize pellets/particles and blaster systems which shave smaller blast particles from blocks of dry ice.

An apparatus for generating carbon dioxide granules from a block, referred to as a shaver, is disclosed in U.S. Pat. No. 5,520,572, which is incorporated herein by reference, in which a working edge, such as a knife edge, is urged against and moved across a block of carbon dioxide. These granules so generated are used as carbon dioxide blast media, being fed introduced into a flow of transport gas, such as by a feeder or by Venturi induction, by a feeder/air lock configuration, and thereafter propelled against any suitable target, such as a workpiece.

It is known to manufacture dry ice pellets/particles at a central location and ship them in suitably insulated containers to customers and work sites, whereas blocks of suitably sized dry ice are not readily available.

The present invention provides a device for forming pellets or large particles into blocks allowing the use of dry ice pellets or particles regardless whether a blasting system is configured for pellets/particles or granules. The resulting block is a non-homogenous agglomeration of pellets/particles formed into a block. Carbon dioxide blast particles may then be generated from the non-homogenous block, and propelled or otherwise directed toward a suitable target.

Although the present invention will be described herein in connection with a particle feeder for use with carbon dioxide blasting, it will be understood that the present invention is not limited in use or application to carbon dioxide blasting. The teachings of the present invention may be used in applications using any suitable type or size of particle blast media that can be reformed formed into blocks.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

Figure 1:
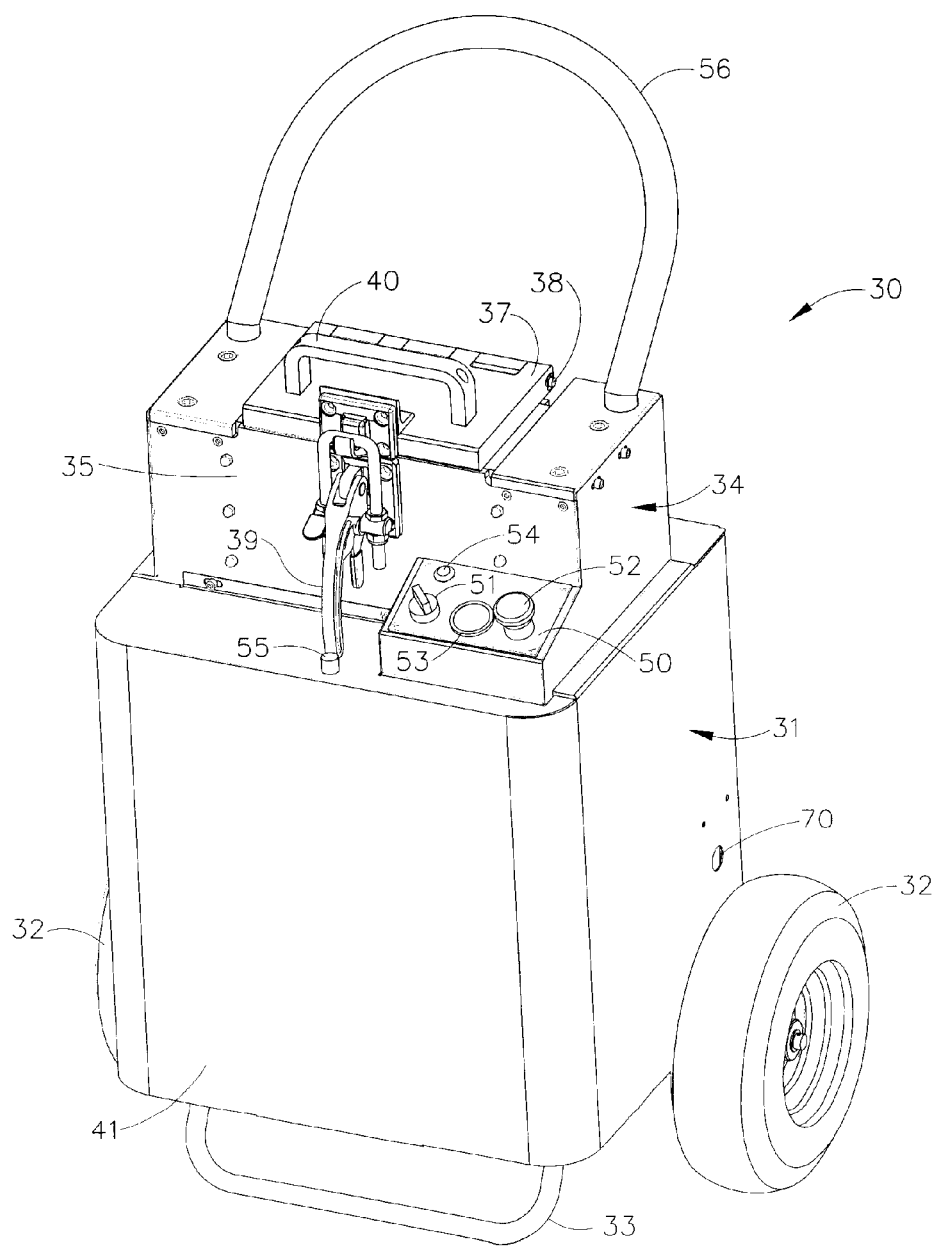
FIG. 1 is a perspective view of a block former constructed in accordance with teachings of the present invention.

Reference will now be made in detail to an embodiment of the invention, an example of which is illustrated in the accompanying drawings.

DETAILED DESCRIPTION OF AN EMBODIMENT OF THE INVENTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment of the invention will now be described.

FIG. 1 shows an isometric view of a block former device 30 in accordance with the teachings of the present invention. Block former device 30 is a portable device for forming carbon dioxide particles into a non-homogenous block. The formed non-homogenous block can be used with carbon dioxide blasters that shave the formed block, and then eject the carbon dioxide shavings as a blast media for cleaning surfaces. Block former device 30 uses a pneumatic compression system to form the carbon dioxide particles into a non-homogenous block, to release compression on the block, and to eject the formed block from the block former device 30. The carbon dioxide particles used to form the non-homogeneous block can vary in size from snow to chunks or pellets that can fit into the block former device 30.

In FIG. 1, the block former device 30 is shown having a rectangular base 31 with at least one removable base cover 41. Rectangular base 31 is supported on the ground by a pair of wheels 32 and a front support bar 33. Block former device 30 can be pneumatically actuated and controlled, and an air inlet port 70 is located on the right side of the rectangular base 31 just above the wheel 32 for the ingress of pressurized air. An air filter 71 and a pressure regulator 72 are located just inside of the rectangular base 31 and are accessible through the inlet port 70.

Figure 8:
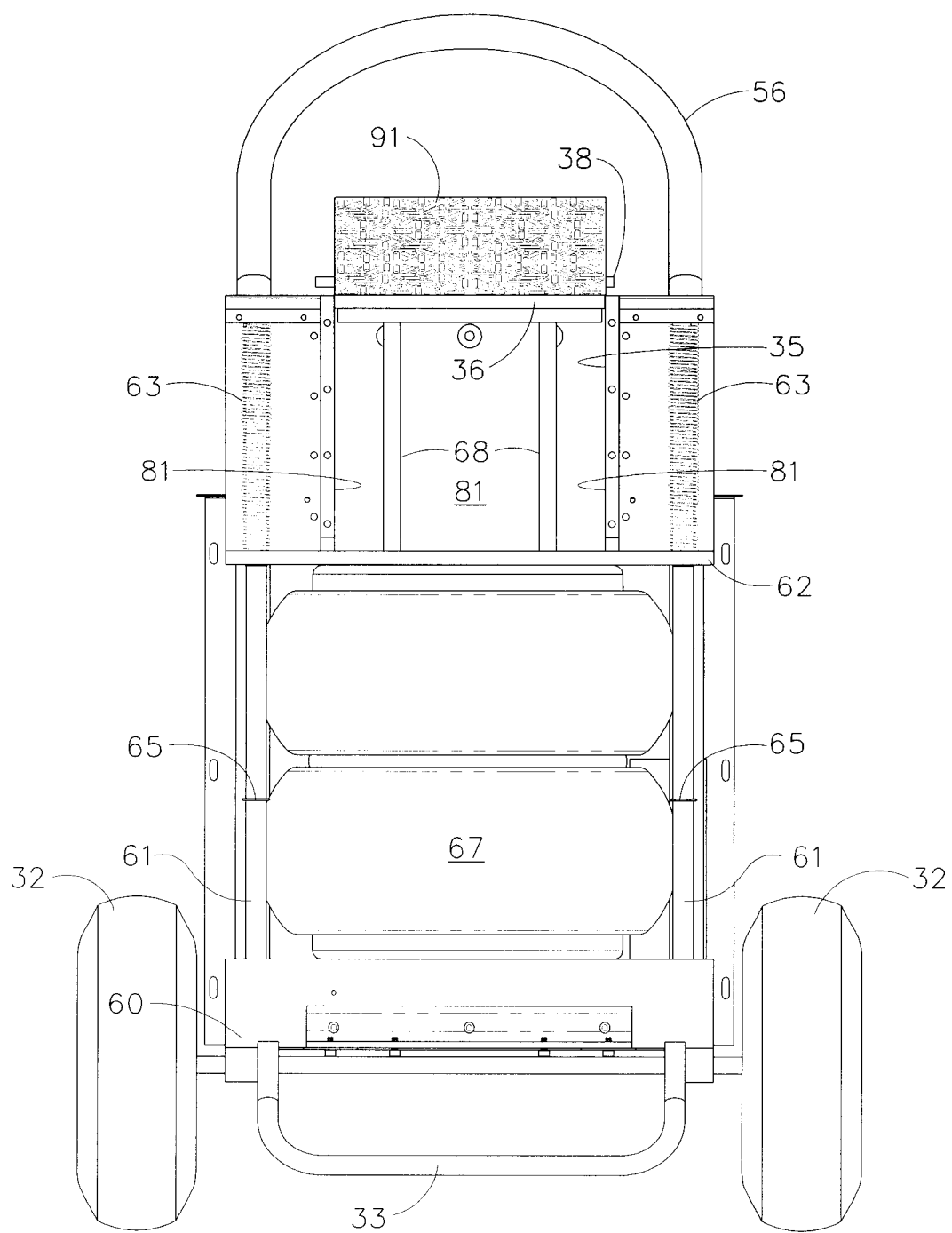
Figure 9:
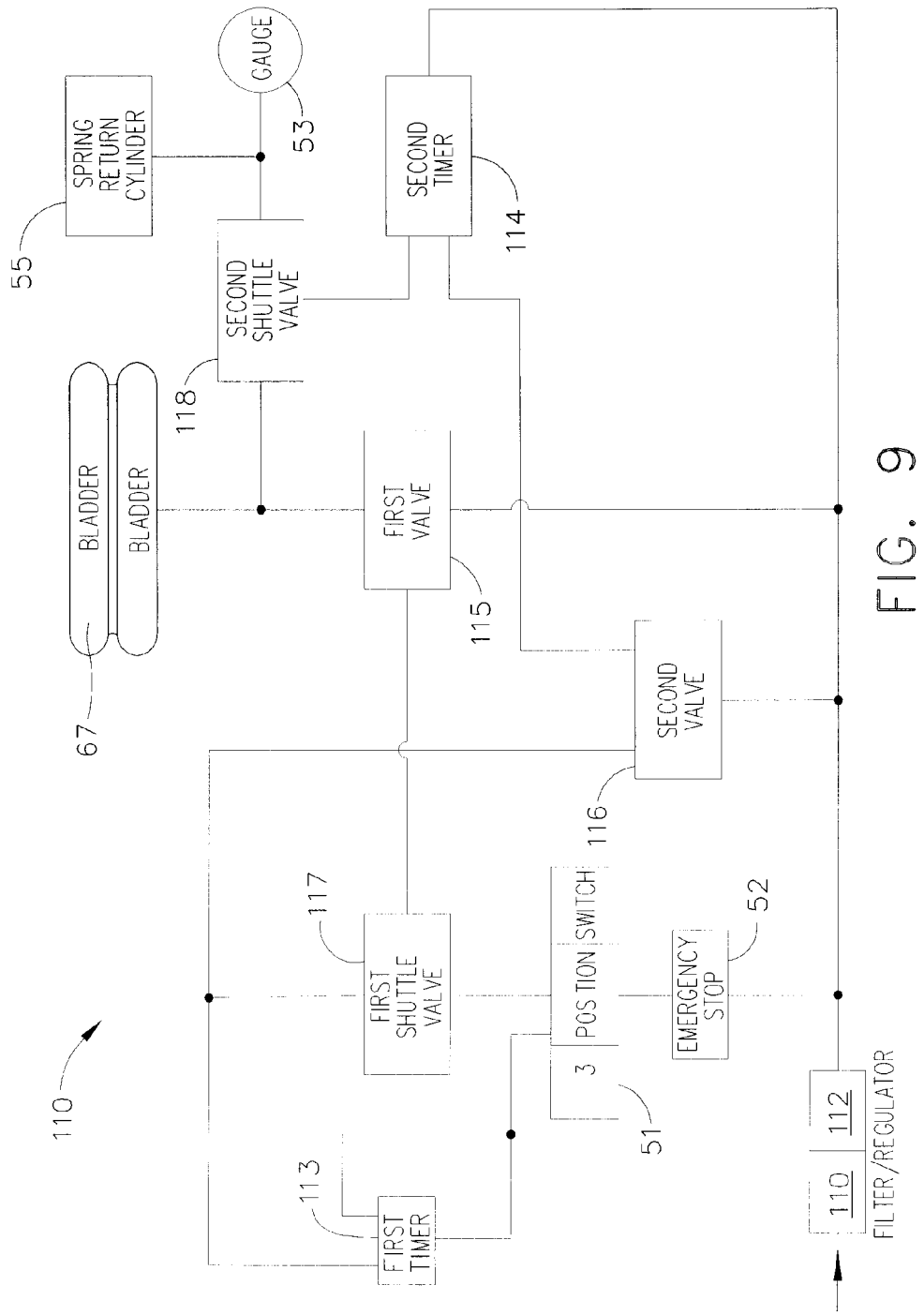
FIG. 9 is a schematic illustration of a pneumatic control system of the block former of FIG. 1.

A chamber assembly 34 is located on top of the rectangular base 31 and comprises a central chamber 35 with a cavity 36 extending downwardly within (FIGS. 8 and 9). Cavity 36 is provided to receive and compress carbon dioxide particles therein, and is covered by a chamber lid 37. Chamber lid 37 is pivotally attached at a rear of the chamber 35 by a pivot pin 38, and a clamp 39 can securely engage with a front of the chamber lid 37 when the chamber lid 37 is closed. The chamber lid 37 can be opened to expose cavity 36 by releasing clamp 39 and using a lid handle 40 to pivot chamber lid 37 to the open position of FIG. 3. A pneumatically actuated spring return cylinder 55 is located in front of the clamp 39 and when actuated, extends upwardly from the chamber assembly 34 to block the release of clamp 39 during the block forming process. The spring return cylinder 55 is a safety device to prevent opening of the chamber lid 37 when the block forming process is actuated. Spring return cylinder 55 is retracted into the chamber assembly 34 at all other times.

A control panel 50 is located in front of the chamber assembly 34 to control the block former device 30 through a series of valves, switches, and timers. The valves, switches, timers, and controls can be pneumatic, electric, or any combination thereof. A three position switch valve 51 is provided with an off position to shut off the block former device 30, a compression cycle actuation position to actuate a compression sequence to form the carbon dioxide particles into a block, and a block ejection position to eject the formed non-homogeneous block. An emergency stop switch 52 is provided to stop all compressions and actuations, and to return all internal mechanisms to a rest or stop position. Control panel 50 can be thermally isolated to prevent chilling of the controls from the carbon dioxide particles in the adjacent chamber 35. Thermal isolation can be accomplished by the use of a thermally insulating material, an air gap, a liner, or any other means to thermally isolate the control system.

Figure 2:
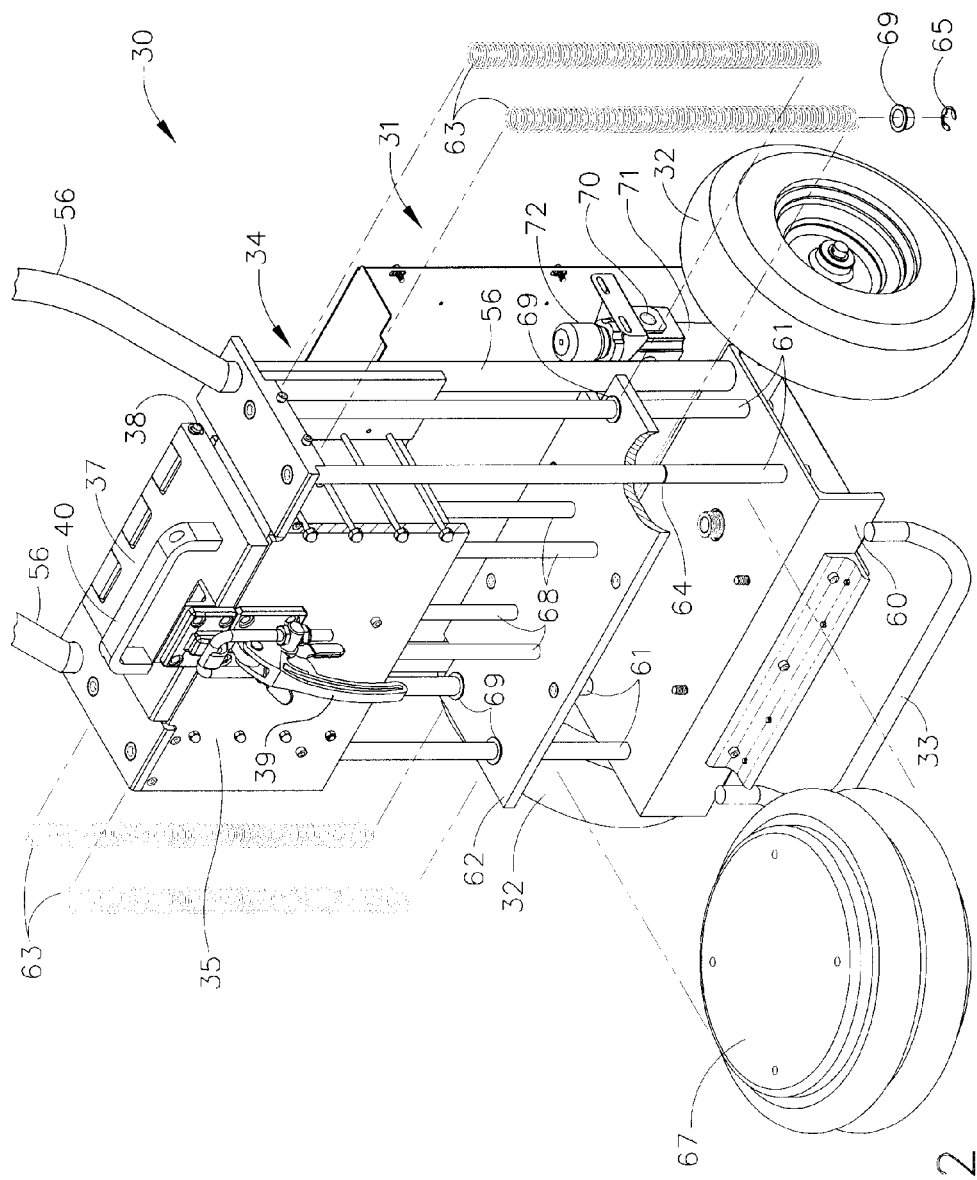
FIG. 2 is perspective view of the block former of FIG. 1, partially cut away and partially exploded, with the covers omitted.
Figure 3:
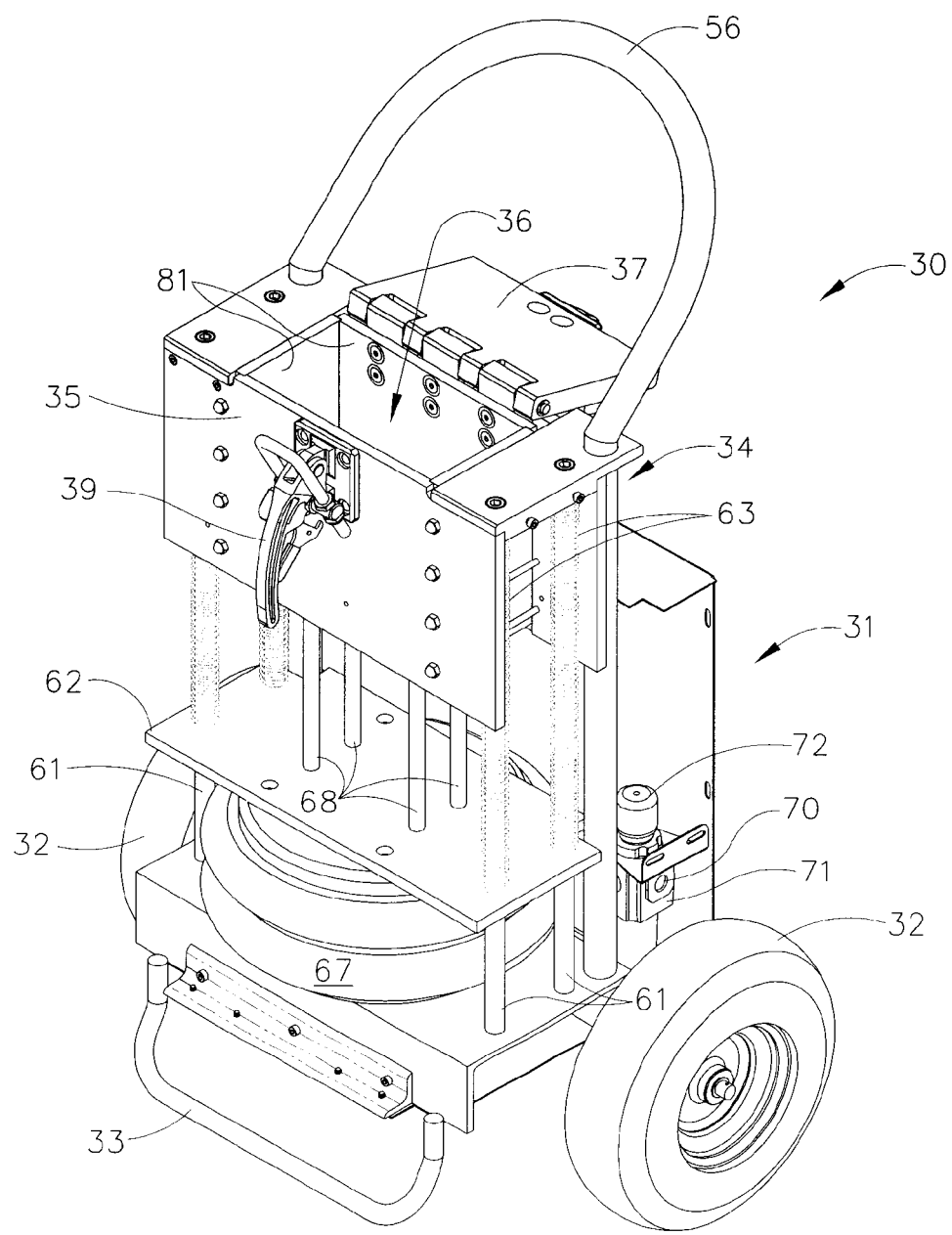
FIG. 3 is a perspective view of the internal elements of the block former of FIG. 1 with the covers omitted and with a chamber lid open to show a cavity therebelow.

A positioning handle 56 extends upwardly at a back of the block former device 30 so that an operator can grasp the positioning handle 56 and tilt an upper portion of the block former device 30 rearward. Block former device 30 is configured to tilt around the wheels 32 to lift the front support 33 off the ground, and is configured to be rolled in the tilted position to another location. Once the block former device 30 is at the new location, the positioning handle 56 is tilted back to the vertical position to bring the front support 33 into contact with the ground FIG. 2 is perspective view of the block former device 30, partially cut away and partially exploded, with the at least one removable base cover 41 and the control panel 50 omitted for clarity. A rectangular support base 60 is formed from a channel, and is supported above the ground by rotatable wheels 32 and front support 33. Rotatable wheels 32 are attached to a left and a right side thereof and the front support 33 is fixedly attached to a front of the support base 60. The above-mentioned valves, switches, and timers can be attached to an underside of the support base 60. Four rigid frame members 61 extend upwardly from the support base 60 in a rectangular configuration to rigidly support the chamber assembly 34 above in the elevated position shown. A spring plate 62 contains self lubricating bushings 69 and is configured to slide up and down on the frame members 61 between the support base 60 and the chamber assembly 34. A groove 64 is provided in each of the frame members 61 for the reception of a retaining ring 65 therein. The retaining rings 65 act as stops to limit downward travel of the spring plate 62. A compression return spring 63 is placed over each of the four frame members 61, between the movable spring plate 62 and the chamber assembly 34, to normally bias the spring plate 62 downward against the retaining rings 65. In FIG. 2, the return springs 63 are shown exploded away from the frame members 61 for clarity. In FIG. 3, the springs 63 are shown in the proper position mounted over the frame members 61. One or more support structures 68 extend upward from the movable spring plate 62 and into the cavity 36 of the chamber 35. A compression plate 69 and backing plate 80 are attached to a top of the one or more support structures 68 within the cavity 36 of the central chamber 35 (See FIG. 4). Compression plate 69 and backing plate 80 are configured to move vertically within the cavity 36.

In FIG. 2, the positioning handle 56 is located at the rear of the block former device 30 and extends downwardly through the chamber assembly 34. Each end of the "U" shaped positioning handle 56 attaches to the rectangular support base 60 to form a rigid structure therewith. The rigid structure is robust enough to allow tipping and movement of the block former device 30 with the positioning handle 56. The positioning handle 56 also provides additional structural support for the chamber assembly 34. The air inlet port 70, the air filter 71, and the pressure regulator 72 can be seen located just behind a vertical portion of the positioning handle 56 on the right side of the rectangular base 31. Air inlet port 70 is positioned just above the wheel 32 to provide an attachment point for an air line (not shown) containing pressurized air.

Figure 7:
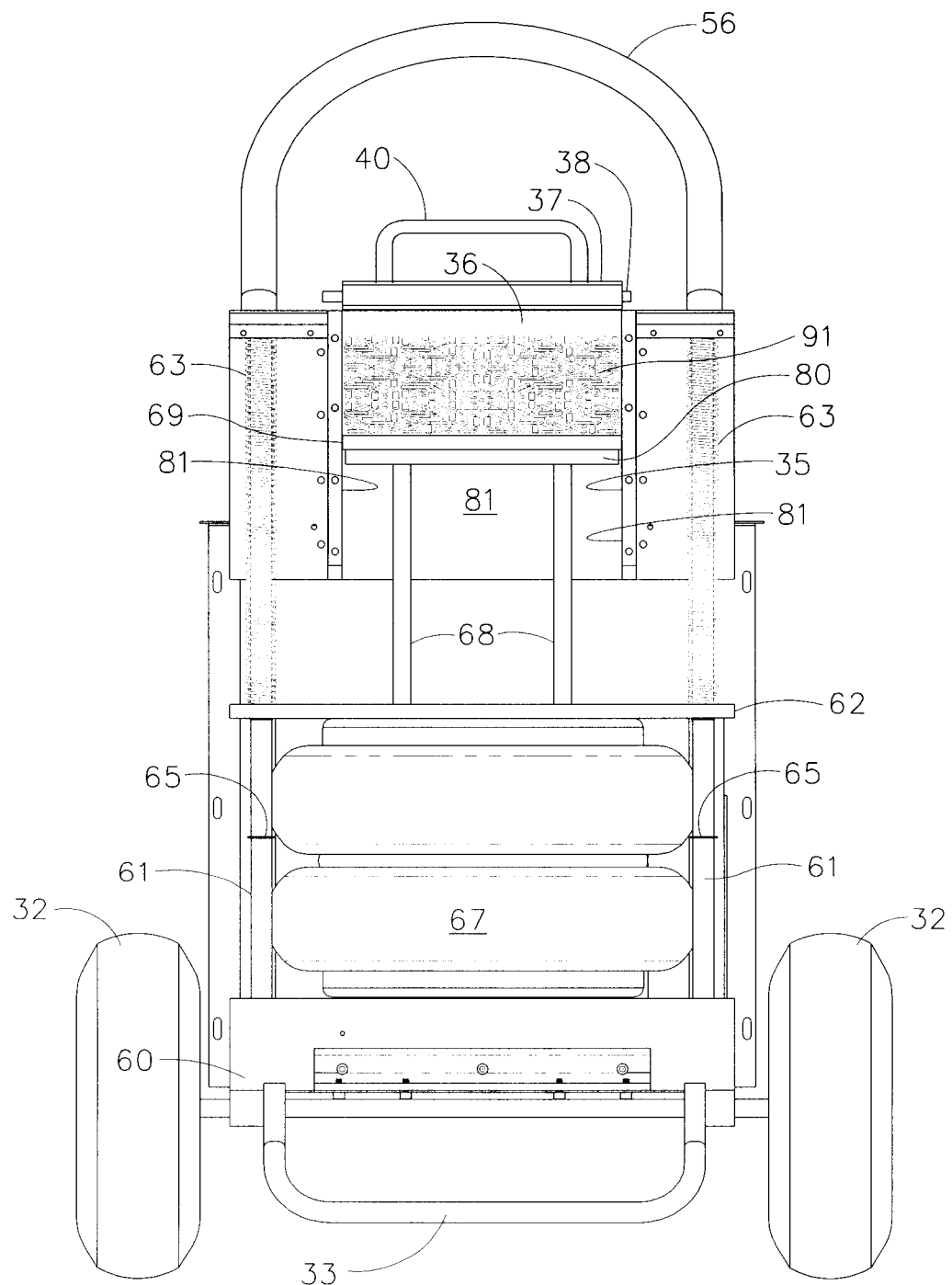

An expanding structure, such as but not limited to an expanding bellows 67 is shown being inserted into position on top of the support base 60 and below the spring plate 62. Expanding bellows 67 can be pneumatically actuated with low pressure air to increase in height, and to contact and move the spring plate 62 up to provide compression on the dry ice particles 90 (FIG. 5) during a compression stroke. This upwards movement of the spring plate 62 is caused by expansion of the expanding bellows 67 which provides sufficient force to form the carbon dioxide particles 90 into a non-homogeneous block 91 (FIG. 7). One example of a suitable expanding structure is a Firestone two ply double convoluted bellows, style 233-2, part number WO1-358-6810, which has two spaced apart rigid plates connected to each other through a longitudinally/axially expandable side wall. The compressed height of the expanding bellows 67 is about six inches, and the stroke is about 8.5 inches. The expanding bellows 67 may be operated with low pressure air between 30 and 150 psi, with a preferred pressure between about 70 psi to 80 psi. Air is introduced through an orifice in a bottom plate (not shown) of the expanding bellows 67. Although the block former device 30 as disclosed herein advantageously (but not limited thereto) utilizes such an off the shelf bellows resulting in low production costs and added safety from a low operating pressure bladder, the method of the present invention is not limited to such a structure. Conversely, when air is vented from the inflated expanding bellows 67, the compression return springs 63 push downwardly on spring plate 62 to compress and return the expanding bellows 67 to the unexpanded position.

FIG. 3 shows the elements of FIG. 2 fully assembled. The chamber lid 37 is shown open to expose the cavity 36 within the chamber 35. Cavity 36 is ready to be filled with particles of carbon dioxide.

Figure 4:
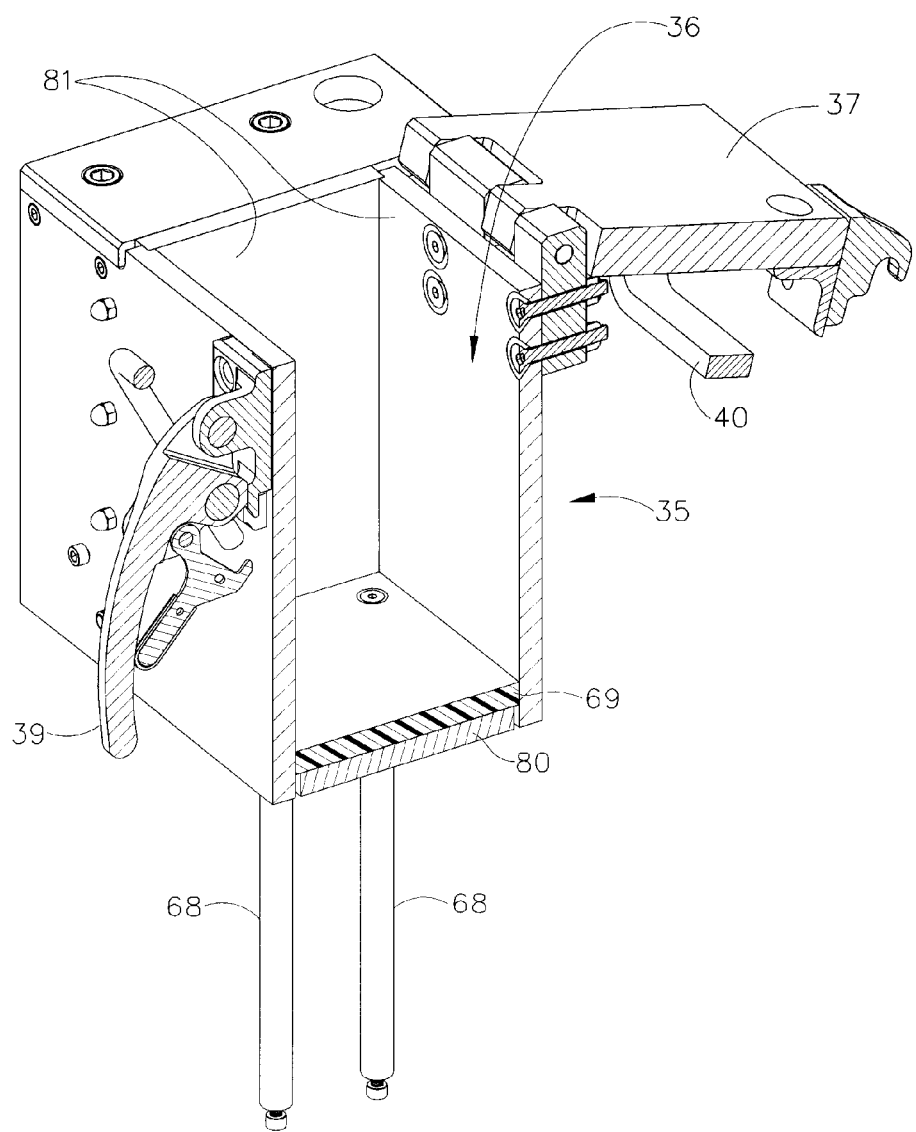
FIG. 4 is an enlarged, fragmentary perspective section view of the chamber of the block former of FIG. 1.

FIG. 4 shows an enlarged, fragmentary section view of the chamber 35 and the cavity 36. Chamber lid 37 is shown open with clamp 39 unlocked so that the cavity 36 of the chamber 35 can receive pellets or other large particles, such as of carbon dioxide. The walls 81 of the chamber 35 are formed of anodized aluminum and defined at the bottom by the vertically moveable compression plate 69 attached to a top of the at least one structure 68 extending upward from the vertically movable spring plate 62. Inflation of the expanding bellows 67 moves the compression plate 69 vertically upwards within the cavity 36 of the chamber 35, and deflation of the expanding bellows 67 moves the compression plate 69 downwards.

When carbon dioxide particles are to be compressed into the non-homogeneous block, the chamber lid 37 is closed, and the clamp 39 is actuated to lock the chamber lid 37 in the closed position. As the expanding bellows 67 are inflated, the compression plate 69 and the backing plate 80 move upwards to compress the carbon dioxide particles against the walls 81 of the chamber 35 and against an inner surface of the chamber lid 37.

The compression plate 69 is formed from a synthetic material, such as but not limited to nylon, and is surmounted to a rigid backing plate 80. The clearance between the perimeter of the compression plate 69, backing plate 80 and the walls 81 of the chamber 35 is about 0.050 inches for the length and width. The cavity 36 within the chamber 35 in this embodiment depicted, is 5" deep×10" wide×10" (inches) high, but other chamber sizes can be used. At its maximum upwards compression stroke, the compression plate 69 advances upwards and is resisted by the pellets/particles 90 within the chamber. At the fully upwards position, the size of the cavity 36 is reduced to about 5"×10"×5" (inches).

Operation of the Block Former Device

Figure 5:
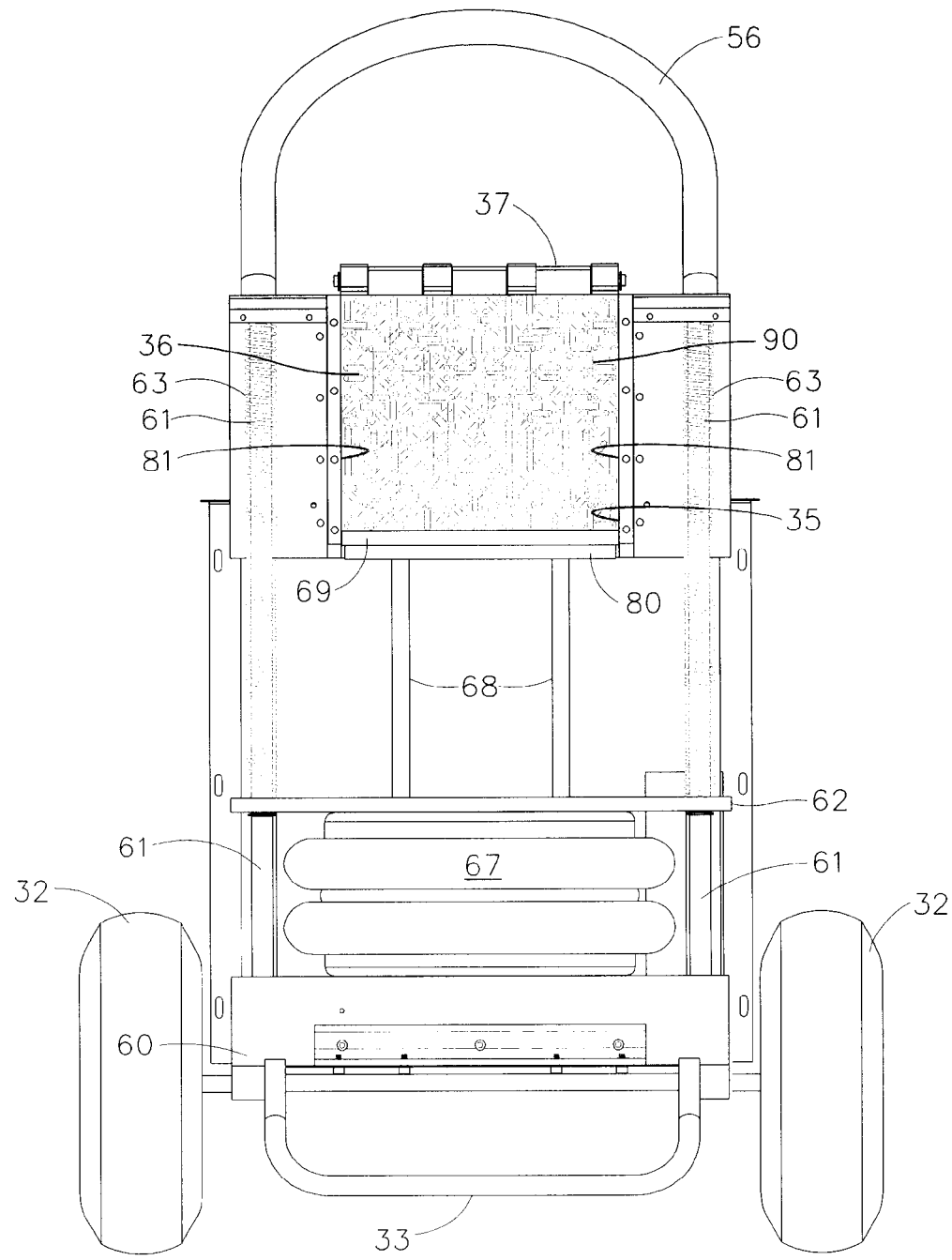
FIGS. 5-8 are front elevation views of the block former of FIG. 1 with the covers omitted and the front plate of the chamber omitted, illustrating the process of filling the chamber, compressing the pellets into a block, retracting the compression plate to relieve pressure so the lid may be opened, and ejecting the block.

FIGS. 5-8 are front elevation views of the block former device 30 with the at least one removable base cover 41 and the control panel 50 omitted for clarity. These FIGS. 5-8 illustrate the operation of the block former device 30 as it converts carbon dioxide particles into a non-homogeneous block of carbon dioxide. The block is subsequently, either immediately or at an appropriate later time, put into a block shaver to generate granules used as blast media, to be propelled at any suitable target. In FIG. 5, the cavity 36 of the chamber 35 is shown with the compression plate 69, and backing plate 80 in the fully downward position. In use, the cavity 36 of the chamber 35 is filled with suitably sized carbon dioxide particles 90, and the chamber lid 37 is closed and secured with the over center clamp 39 (removed for clarity) or any other suitable structure. An air hose (not shown) is connected to the inlet port 70 to feed compressed air into the block former device 30. Actuating the 3 position switch 51 to the compression cycle actuation position actuates a compression sequence to form the carbon dioxide particles 90 into a block. When the compression sequence is initiated by actuating the switch 51, compressed air is sent into the expanding bellows 67, and into spring return cylinder 55 (FIG. 1) to expand the cylinder 55 thereof and to lock the chamber lid 37 in the closed position.

Figure 6:
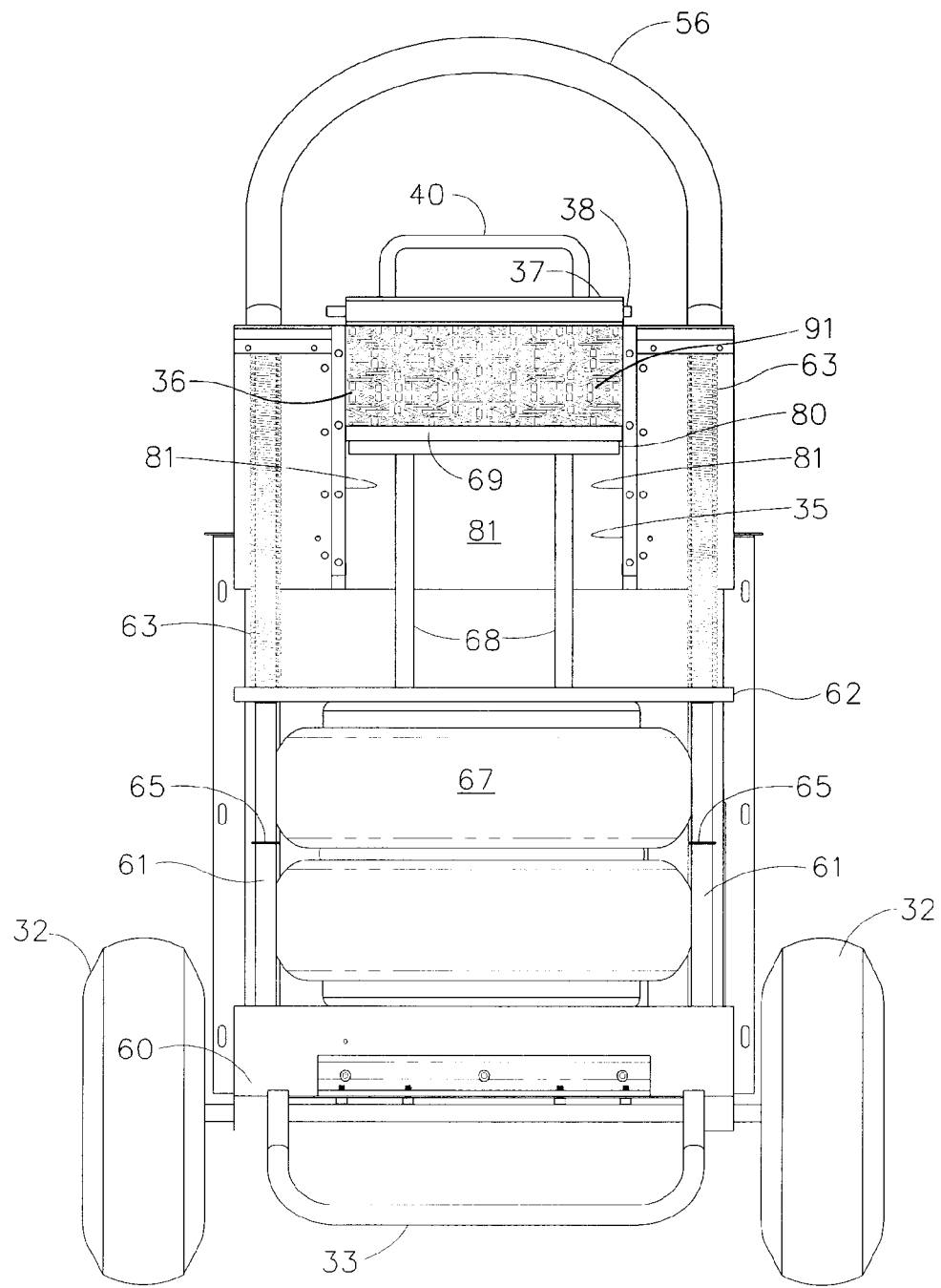

As shown in FIG. 6 the compression plate 69 and backing plate 80 are advanced by the expanding bellows 67 toward the closed and locked chamber lid 37, urging the cryogenic carbon dioxide particles 90 into a non-homogenous agglomerated block 91. As the compression plate 69 moves up, return springs 66 are compressed. Upwardly moving compression plate 69 compresses the uncompressed carbon dioxide particles 90 against the walls 81 of the chamber 35 and against an inner surface of the chamber lid 37. At the full upwards position of the compression stroke, a pneumatic timing system is actuated (See schematic in FIG. 9), which interrupts and holds the upward movement of the compression plate 69. In the embodiment depicted, the timer 100 times out after a holding time between about 60 seconds and 90 seconds to ensure compression of the compressed carbon dioxide 90, thereby forming the reduced height formed block 91 of non-homogeneous carbon dioxide. As described above, block former device 30 is configured to operate at a range of low pressures, and the lower portions of the above pressure ranges can increase the need for additional time to form the formed block 91. The formed block 91 is non-homogeneous in that voids can be found within. As shown in FIG. 7, at the end of the compression delay, a valve is opened by the control system 110 to release the pressure in the internal cavity of the expanding bellows 67. With the bellows venting to the outside air, the four compressed return springs 66 piloted by frame members 61 urge the spring plate 62 downwardly to compress the air from the bellows 67, and concomitantly lower the spring plate 62. This relieves pressure on the locked chamber lid 37, retracts extended spring return cylinder 55 and allows the center clamp 39 to be unlatched to unlock chamber lid 37. Formed block 91 moves downwardly with the deflating bellows 67. After the chamber lid 37 is unlatched, the control switch 51 may be switched to an ejection cycle, and pressure is again delivered to the internal cavity of the bellows 67, moving the compression plate 69 and backing plate 80 to the position shown in FIG. 8 so that the formed block 91 may be removed. The control switch 51 may then be moved to off, allowing the bellows 67 and compression plate 69 to retract.

FIG. 9 is a schematic of a control system 110 used to control the operation of the block former device 30 as described above for FIGS. 5-8. As shown, the control system 110 is pneumatic, but is not limited thereto. As shown, an air filter 111 is provided to filter incoming air from the air line (not shown). A pressure regulator 112 regulates the incoming air pressure to a desired pressure. A gauge 53 (see FIG. 1) is provided to indicate the air pressure within the control system 110. The emergency stop 52 is provided to vent pressure from the control system 110 and block former device 30, and to return all components thereof to a retracted position. The three position switch 51 is used to actuate the compression cycle and the ejection cycle. Bladder 67 and spring return cylinder 55 can be inflated and deflated at appropriate times via interaction of pneumatic logic components including a first timer 113, a second timer 114, a first valve 115, a second valve 116, a first shuttle valve 117 and a second shuttle valve 118.

The foregoing description of an embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the preferred embodiment, specific terminology was used for the sake of clarity. It is to be understood that each specific term includes all technical equivalents which operate in a similar manner to accomplish a similar purpose. It is intended that the scope of the invention be defined by the claims submitted herewith.

What is claimed is:

1. A method for compressing discrete particles of carbon dioxide particles into a non-homogeneous block with a block former, said block former comprising a chamber and a compression plate, the method comprising the steps of:
   a. placing discrete carbon dioxide particles into the chamber in contact with the compression plate;
   b. compressing the carbon dioxide particles with the compression plate to form the non-homogenous block;

c. releasing pressure on the non-homogenous block by retracting the compression plate; and d. ejecting the non-homogeneous block from the chamber with the compression plate.

2. The method of claim 1 wherein the block former device further comprises at least one logic system to control timing and sequencing of the steps b-d.

3. The method of claim 2 wherein the block former device further comprises at least one timer to control the timing of the steps b-c.

4. The method of claim 3 wherein the step of compressing the carbon dioxide particles is for a time between about 60 seconds to about 90 seconds.

5. The method of claim 3 wherein the step of compressing the carbon dioxide particles into the non-homogenous block with the compression plate further comprises applying pressure to the compression plate with a fluid pressurized to a pressure between about 50 psi to about 150 psi.

6. The method of claim 5 wherein the block former device further comprises an inflatable bellows configured to apply pressure to the compression plate when the bellows is inflated with the fluid.

7. The method of claim 2 wherein the former device further comprises a lid located opposite to the compression plate for compression of the carbon dioxide particles there against, and movable from an open position to a closed position, wherein the method further includes a step of securely closing the lid prior to the step of compressing the carbon dioxide particles against the closed lid.

8. The method of claim 7 wherein the former device further comprises a lock to lock the lid during steps b-c.

9. The method of claim 7 further comprising a step of opening the lid prior to the step of ejecting the non-homogeneous block from the block former device.

10. The method of claim 2 wherein the former device further comprises at least one actuation switch and the method further comprises actuating the actuation switch to eject the non-homogeneous block from the block former device.

11. The method of claim 3 wherein the step of releasing pressure on the formed non-homogenous block by retracting the compression plate is timed.

12. The method of claim 2 wherein the logic system is pneumatic.

13. A method of forming existing carbon dioxide particles into a non-homogenous block, the method comprising the steps of:

a. placing discrete carbon dioxide particles into a chamber;

b. compressing said carbon dioxide particles in the chamber to form the non-homogenous block;

c. releasing pressure on the non-homogenous block; and d. ejecting the non-homogeneous block from the chamber.

14. The method of claim 13 wherein the block former device further comprises at least one logic system to control timing and sequencing of the steps b-d.

15. The method of claim 14 wherein the block former device further comprises at least one timer to control the timing of the steps b-c.

16. The method of claim 15 wherein the step of compressing the carbon dioxide particles is for a time between about 60 seconds to about 90 seconds.

17. The method of claim 15 wherein the step of compressing the carbon dioxide particles into the non-homogenous block further comprises compressing the carbon dioxide particles with a pressure plate and applying pressure to the compression plate with a fluid pressurized to a pressure between about 50 psi to about 150 psi.

18. The method of claim 17 wherein the step of applying pressure to the pressure plate further comprises inflating an inflatable bellows configured to apply pressure to the compression plate when the bellows is inflated with the fluid.

19. The method of claim 15 wherein the step of releasing pressure on the formed non-homogenous block is timed.

20. The method of claim 14 wherein the logic system is pneumatic.

* * * * *